United States Patent [19]

Pirro, Jr.

[11] 4,278,166

[45] Jul. 14, 1981

[54] ACCUMULATOR CONVEYOR

[76] Inventor: Michael S. Pirro, Jr., 9804 Butternut Dr., Crystal Lake, Ill. 60014

[21] Appl. No.: 69,878

[22] Filed: Aug. 27, 1979

Related U.S. Application Data

[63] Continuation-in-part of Ser. No. 918,512, Jun. 23, 1978, Pat. No. 4,238,029.

[51] Int. Cl.$^3$ .................................. B65G 13/06
[52] U.S. Cl. ................................ 198/781; 198/790
[58] Field of Search ............. 198/781, 789–791, 198/842, 843; 24/230.6, 230.7, 230.24

[56] References Cited

U.S. PATENT DOCUMENTS

| | | | |
|---|---|---|---|
| 2,326,670 | 8/1943 | Patterson | 74/230.7 |
| 3,718,248 | 2/1973 | Muller | 198/781 |
| 3,729,088 | 4/1973 | Vom Stein et al. | 198/781 |
| 3,934,482 | 1/1976 | Byers | 74/230.7 |
| 3,939,962 | 2/1976 | Gebhardt | 198/781 |
| 4,030,569 | 6/1977 | Berkovitz | 74/230.24 |
| 4,091,916 | 5/1978 | Warner | 198/790 |
| 4,108,304 | 8/1978 | McKnight et al. | 198/781 |
| 4,164,998 | 8/1979 | De Good et al. | 198/790 |
| 4,196,312 | 4/1980 | De Good et al. | 198/790 |

FOREIGN PATENT DOCUMENTS 2528569  3/1976  Fed. Rep. of Germany .......... 198/781

*Primary Examiner*—Joseph E. Valenza
*Attorney, Agent, or Firm*—Fitch, Even, Tabin, Flannery & Welsh

[57] ABSTRACT

An accumulating conveyor having a plurality of article carrier rollers arranged along the conveyor and employing drive wheels each of which has a peripheral drive surface adapted for driving engagement with at least one carrier roller. An annular groove is formed in the drive surface of each drive wheel and receives the drive reach of a drive cable therein so that the drive cable is disposed between the drive wheels and carrier rollers, the drive wheels being formed so as to effect increased frictional gripping with the drive cable when their drive surfaces are in driving engagement with the associated carrier rollers. In selected embodiments, the drive wheels act as clutch wheels and are mounted for controlled pivotal movement between driving and non-driving positions relative to the carrier rollers. Brake means may be provided to brake the carrier rollers when the clutch wheels are moved to their non-driving positions.

15 Claims, 8 Drawing Figures

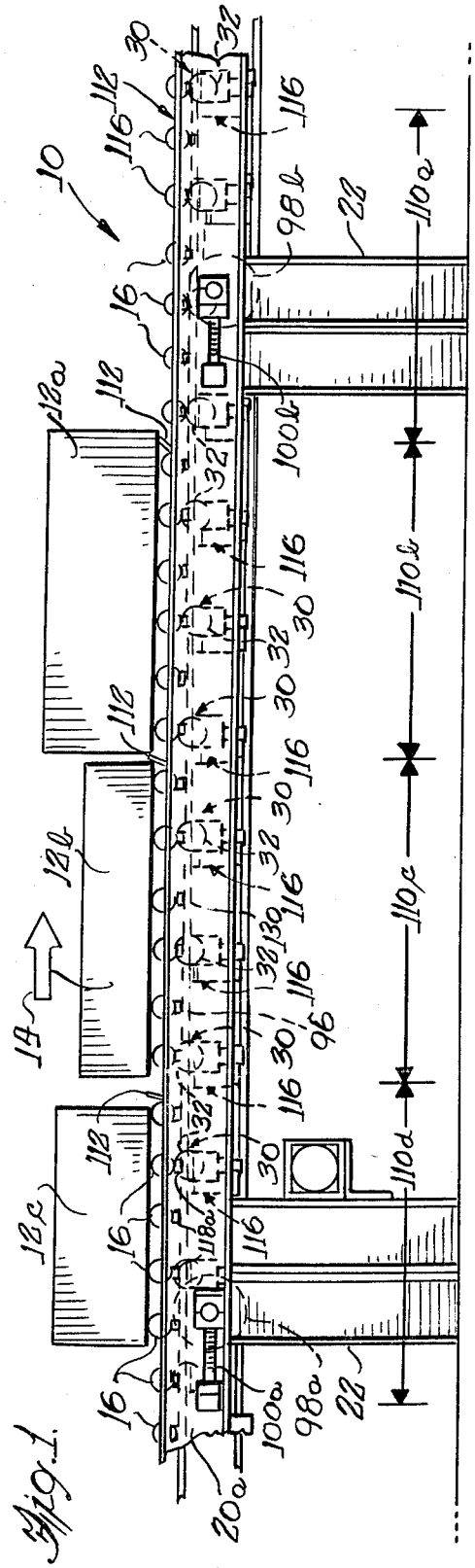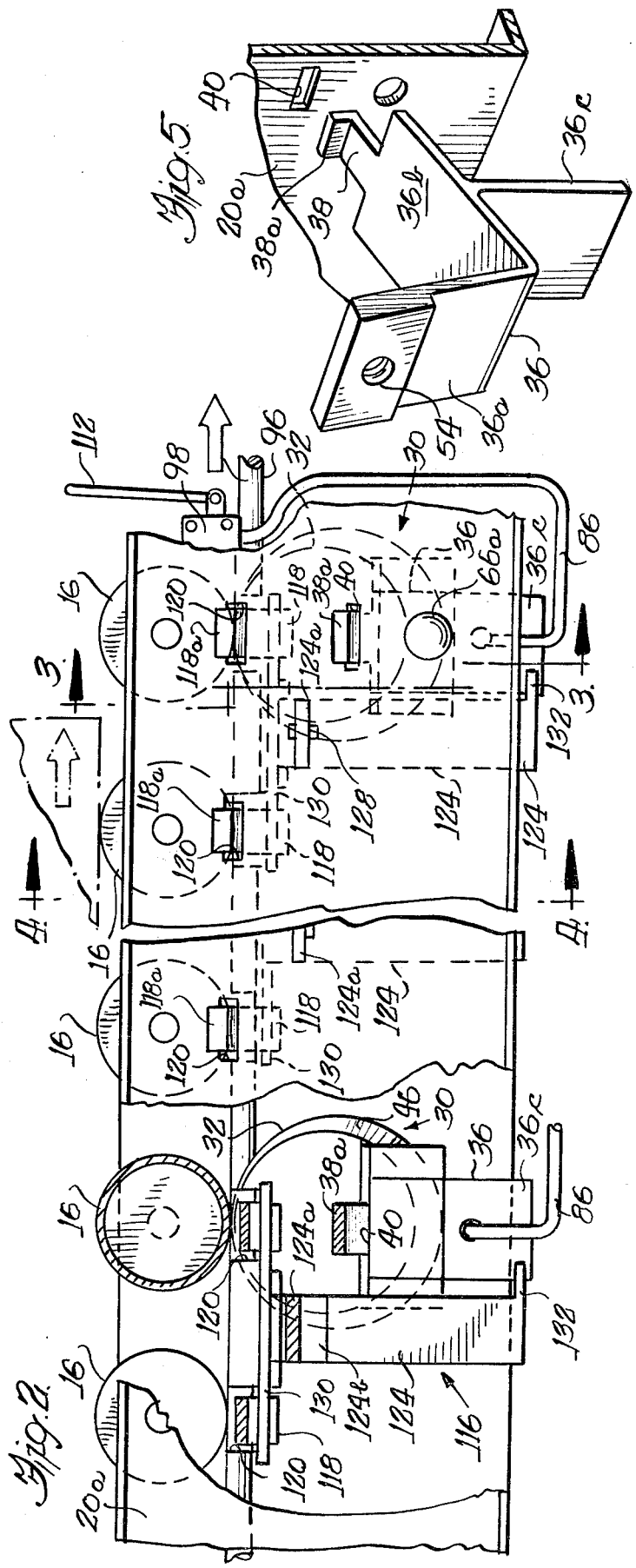

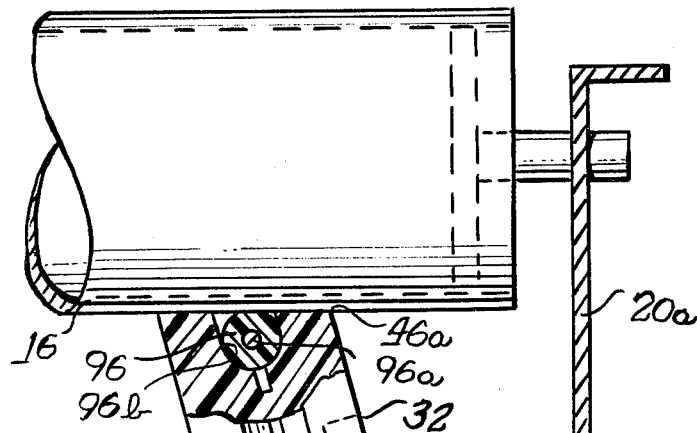

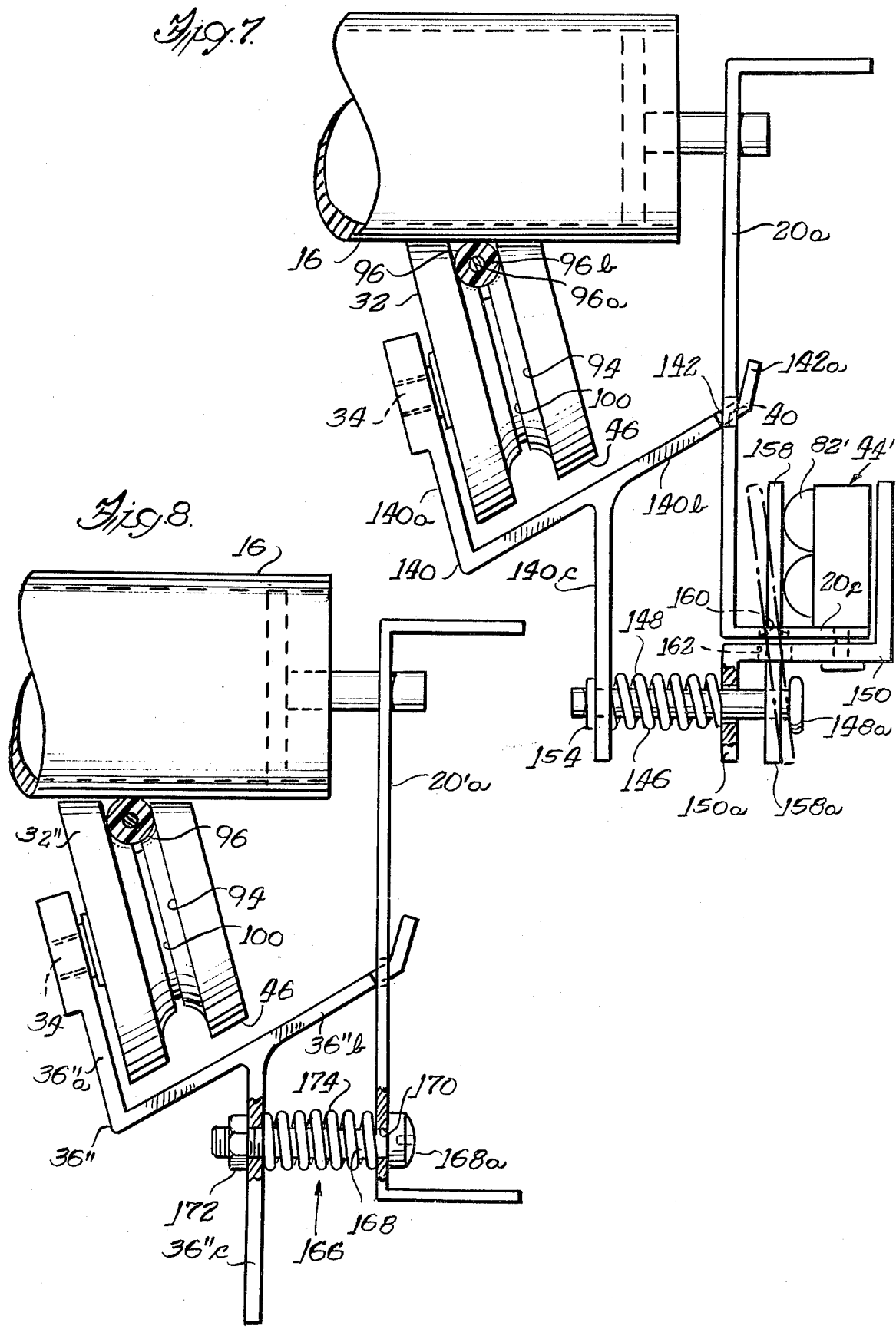

ACCUMULATOR CONVEYOR

This is a continuation-in-part from application Ser. No. 918,512, filed June 23, 1978 now U.S. Pat. No. 4,238,029, and relates generally to power driven accumulator conveyors, and more particularly to an accumulator conveyor employing article carrier rollers and novel drive or clutch wheels each of which has a peripheral drive surface in which is formed an annular groove to receive a drive cable, the drive wheels being configured to effect increased frictional gripping with the drive cable when the peripheral drive surfaces of the drive wheels are in driving engagement with associated carrier rollers.

When employed as clutch wheels, the cable driven drive wheels are pivotally movable between driving positions wherein their peripheral drive surfaces engage and drive at least one carrier roller, and nondriving positions spaced from the associated carrier rollers during which the rollers are braked in response to article sensor control means so that substantially zero pressure engagement is effected between accumulated articles on the conveyor.

Power driven accumulator conveyors capable of conveying articles along a predetermined path so that very low or substantially zero pressure engagement is effected between adjacent articles accumulated on the conveyor when movement of one or more of the articles is impeded, are generally known. In general, the known accumulator conveyors of the aforenoted type employ endless drive means in the form of a driven belt or cable which is supported with a drive reach engaging the lower surfaces of a plurality of support and carrier rollers. In the case of "low pressure" accumulator conveyors, the drive cable is continually driven so that stoppage of any conveyor rollers due to stoppage of an article thereon causes the drive cable to slide under the stopped conveyor rollers. If the cable speed is too fast, friction between the rollers and drive cable creates a high heat factor which may cause undue wear and/or breakdown of the drive cable. When employing a drive cable which comprises an axial metallic cable having a coaxial plastic coating or sheath thereon, the frictional heat may cause separation of the plastic coating from the axial cable. It is thus highly desirable that low pressure accumulator conveyors be capable of easy and accurate adjustment to vary the pressure applied by the drive cable against the conveyor rollers so that friction heat between the drive cable and conveyor rollers is minimized.

In the case of "zero pressure" accumulator conveyors, the conveyors conventionally have descrete sections or zones along their lengths, each zone having a plurality of article supporting and carrying rollers adapted to be rotatably driven independently of the rollers of other zones so as to facilitate controlled movement of articles on the various zones. Each zone generally has one or more sensors thereon adapted to sense the presence of an article on the corresponding zone so that when advancing movement of an article on a particular zone is slowed down or significantly impeded, one or more sensors is activated to deactivate the driven carrier rollers in one or more zones upstream from the motion impeded article so as to prevent excessive or damaging pressure engagement between adjacent accumulated articles on the conveyor. The drive belt may be controlled so as to undergo intermittent movement in response to article sensors on the conveyor, or may be adapted for movement out of engagement with the carrier rollers in response to impeded movement of one or more articles on the conveyor. See, for example, U.S. Pat. No. 3,768,630 which discloses an accumulator conveyor employing a continuously driven flat drive belt which is moved between driving and nondriving engagement with article carrier rollers disposed within different zones along the conveyor in response to article detecting sensors on the conveyor. Another example of an accumulator conveyor employing a continuously driven drive belt which is normally maintained in direct driving engagement with article support and carrier rollers but which may be moved to a non-driving position spaced from the carrier rollers is disclosed in U.S. Pat. No. 3,967,718.

In another type of accumulator conveyor wherein articles are conveyed by driven carrier rollers arranged in successive groups, the carrier rollers of each group are rotatably driven by drive wheels which are carried on a frame for pivotal movement between driving positions operable to transmit motion from the driving reach of a driven endless drive belt to the corresponding article carrier rollers, and non-driving positions spaced from the drive belt and corresponding carrier rollers. See, for example, U.S. Pat. No. 3,718,248.

Virtually all of the known power driven accumulator conveyors adapted to effect selective driving rotation of zones of article support and carrier rollers so that substantially zero pressure engagement is effected between accumulated articles on the conveyor employ relatively complex structures and are therefore relatively expensive to manufacture and service.

A general object of the present invention is to provide a power driven accumulator conveyor which employs novel drive wheels adapted for driving engagement with a drive cable and article carrier rollers supported along the length of the conveyor, the drive wheels being adapted for use in both low and substantially zero pressure accumulator conveyors.

A more particular object of the present invention is to provide an accumulator conveyor employing a plurality of article carrier rollers selected ones of which are driven by drive wheels having peripheral drive surfaces adapted to engage associated carrier rollers in driving engagement therewith, each drive wheel having an annular groove formed therein to receive the driving reach of an endless drive cable, and the drive wheels being configured to increase their frictional gripping relation with the drive cable as the peripheral drive surfaces of the drive wheels engage their corresponding carrier rollers in driving relation.

Another object of the present invention is to provide, in one form of the invention, an accumulator conveyor employing carrier rollers adapted to be selectively driven by novel clutch wheels having frustoconical peripheral drive surfaces each of which has an annular groove formed therein to receive the driving reach of an endless drive cable, the clutch wheels being movable between non-driving positions spaced from corresponding carrier rollers and driving positions where the peripheral drive surfaces engage associated carrier rollers in driving relation, and the clutch wheels also being configured to effect increased frictional gripping relation with the drive cable when the peripheral drive surfaces are in driving relation with the carrier rollers so as to provide improved driving efficiency.

Still another object of the present invention is to provide an accumulator conveyor in accordance with the preceding object and in which a brake mechanism is operatively associated with each of the clutch wheels and one or more carrier rollers so as to brake selected ones of the carrier rollers when the clutch wheels are moved to their non-driving positions.

A feature of the accumulator conveyor in accordance with the invention lies in the provision of a novel drive cable receiving groove in the peripheral drive surface of each drive or clutch wheel to effect improved frictional gripping of the drive or clutch wheels with the drive cable when the peripheral drive surfaces are in driving engagement with associated carrier rollers and the drive cable in interposed between the drive or clutch wheels and the associated carrier rollers.

Further objects and advantages of the present invention, together with the organization and manner of operation thereof, will become apparent from the following detailed description of the invention when taken in conjunction with the accompanying drawings wherein like reference numerals designate like elements throughout the several views and, wherein:

FIG. 1 is a fragmentary side elevational view of a section of an accumulator conveyor constructed in accordance with one embodiment of the present invention;

FIG. 2 is a fragmentary side elevational view, on an enlarged scale, of a portion of the accumulator conveyor of FIG. 1, portions being broken away for clarity;

FIG. 3 is a transverse sectional view, on an enlarged scale and taken substantially along line 3—3 of FIG. 2 looking in the direction of the arrows, illustrating the clutch wheel in driving engagement with an associated carrier roller and with the braking mechanism removed for purposes of clarity;

FIG. 4 is a transverse sectional view generally similar to FIG. 3 but taken substantially along line 4—4 of FIG. 2 and illustrating the cooperation of a brake mechanism with a clutch wheel, the actuator for the clutch wheel being removed for purposes of clarity;

FIG. 5 is an expoded perspective view illustrating a clutch wheel support bracket and the manner in which it is mounted on an associated side frame of the conveyor;

FIG. 6 is a fragmentary sectional view illustrating an alternative embodiment of a drive or clutch wheel in accordance with the present invention;

FIG. 7 is a transverse sectional view similar to FIG. 3 but illustrating an alternative manner of actuating a clutch wheel in accordance with the invention; and FIG. 8 is a transverse sectional view similar to FIG. 7 but illustrating an alternative manner of supporting a drive wheel, as may be employed in low pressure accumulator conveyors, in accordance with the invention.

Referring now to the drawings, and in particular to FIG. 1, a portion of an accumulator conveyor constructed in accordance with the present invention is indicated generally at 10. The accumulator conveyor 10, which may also be termed a live roller conveyor, is of the type having a plurality of free zones which cooperate to convey a plurality of articles, cartons or packages, such as indicated at 12a-c, along the conveyor in the direction of the arrow 14 so that, should progress of one of the articles be impeded or interrupted, either intentionally or unintentionally within a particular zone, the articles rearwardly or in "upstream" zones from the zone in which the article has its forward motion impeded will accumulate with substantially zero pressure engagement between adjacent articles. By "substantially zero" accumulation is meant that the contact pressure between accumulated articles on a conveyor will be close to zero pressure when the forward motion of a downstream article is stopped.

The articles 12a-c are supported on and transferred along the conveyor 10 by a plurality of article support and carrier rollers 16 which are rotatably supported by and between parallel side frame members 20a and 20b. The side frame members 20a, b define the longitudinal axis of the conveyor and with the rollers 16, establish the path traversed by articles conveyed along the conveyor. In the illustrated embodiment, the side frame members 20a, b are supported horizontally on the upper ends of upstanding standards 22 suitably spaced along the length of the conveyors so as to support the carrier rollers 16 in horizontal planer relation at a desired height above floor level. Transverse frame members (not shown) maintain the side frame members 28a, b in fixed spaced relation as is known. While the illustrated portion of the conveyor 10 comprises a relatively straight conveyor section, the conveyor may be curved in plan configuration.

The article carrier rollers 16 may be of conventional design and each has an axial support shaft 26 the opposite ends of which are journaled to the side frame members 20a, b so that the carrier rollers are disposed in parallel equidistantly spaced relation transverse to the longitudinal axis of the conveyor with the uppermost surfaces of the rollers tangent to a plane spaced above and generally parallel to the upper edges of the frame members 20a, b.

In the illustrated embodiment, alternate ones of the article carrier rollers 16 are selectively rotatably driven to effect movement of articles along the conveyor. Driving of alternate rollers 16 will generally suffice under normal operating conditions to effect the desired movement of articles along the conveyor. However, in heavy duty application, it may be desirable to drive all of the carrier rollers as by driving each adjacent pair of article support rollers through a common drive or clutch wheel to be described more fully hereinbelow.

With particular reference to FIGS. 2-5, taken in conjunction with FIG. 1, each of the alternate driven carrier rollers 16 has operative association with drive means, indicated generally at 30, operative to effect selective rotational movement of the associated carrier roller. Each drive means 30 includes a drive wheel 32 which, in the embodiment of FIGS. 2-5, may be termed a clutch wheel and is rotatably supported on a support shaft 34 for rotation about its longitudinal axis. Each support shaft 34 is mounted on an upstanding arm portion 36a of a support bracket 36, termed a clutch bracket, so as to extend outwardly from the arm 36a in substantially normal relation thereto. Each clutch bracket is pivotally mounted on a common one of the conveyor side frame members, such as 20a, for pivotal movement about a common hinge or pivot axis parallel to the longitudinal axis of the conveyor. To this end, the upstanding arm portion 36a of each clutch bracket is formed integral with or otherwise suitably secured to a second arm portion 36b which has its free end formed with a hinge tab 38 adapted to be received through a corresponding rectangular opening 40 within the frame member 20a and retained therein by an upstanding retainer tab end 38a. The openings 40 are equidistantly spaced along the length of the side frame number 20a so as to vertically underlie the rotational axes of alternate ones of the article carrier rollers 16.

Each clutch bracket 36 has a depending arm portion 36c which, when the clutch bracket is pivotally connected to the frame member 20a, extends downwardly in inwardly spaced relation from the corresponding side frame 20a. In the embodiment illustrated in FIGS. 1-5, each drive or clutch wheel 32 and its associated clutch bracket 36 are biased to a nonoperating position wherein the clutch wheel is spaced from its associated carrier roller by biasing means, indicated generally at 42, and is adapted to be moved to an operating position wherein a peripheral drive surface on the clutch wheel engages the associated carrier roller in driving engagement therewith through selectively energizable actuator means, indicated generally at 44.

As best illustrated in FIGS. 3 and 4, each drive or clutch wheel 32 has a frustoconical peripheral drive surface 46 thereon adapted to progressively engage its associated article carrier roller 16 in increasing area contact therewith as the clutch wheel is moved from a non-operating position spaced from its associated carrier roller, as illustrated in FIG. 4, to a position wherein the peripheral drive surface is in full driving engagement with the associated carrier roller, as illustrated in FIG. 3. To this end, the angle of taper of the frustoconical drive surface 46 on each clutch wheel and the configuration of the associated clutch bracket 36 relative to its pivotal connection to frame number 20a is such that as the clutch bracket is pivoted from its nonoperative position to its operating position, the edge 46a of the frustoconical drive surface will make initial contact with the associated carrier roller 16 followed by progressively greater area contact with the carrier roller as the clutch wheel is brought to its full operating or driving position, as shown in FIG. 3.

In the illustrated embodiment, each clutch wheel 32 has an axial bore 50 in which is fitted a bearing sleeve 52 which receives the associated support shaft 34 therethrough to rotatably support the clutch wheel. The support shaft 34 may be secured to the associated support bracket 36 in any suitable manner such as having threaded connection with a threaded bore 54 in the upstanding arm 36a of the clutch bracket. An annular shoulder 56 is formed on the support shaft and receives an annular bearing or spacer ring 56 thereagainst prior to assembling the clutch wheel thereon. The outer end of the support shaft 34 may have a threaded end to receive a nut 58 thereon which acts against a washer 60 to retain the clutch wheel 32 against the bearing spacer 56 while enabling free rotation of the clutch wheel. The clutch wheels 32 may be die formed and are preferably made of a rubber and plastic composition, such as available under the trade name UNIROYAL TPR 2800, so as to provide the desired pliability as will become more apparent herein below.

As aforementioned, each drive or clutch wheel 32 in the embodiment illustrated in FIGS. 2-5 is biased to its nonoperating position by biasing means 42. The biasing means 42 includes a control rod 66 having an enlarged head 66a at one end thereof and extending through a suitable opening 68 in the frame member 20a, the inner end of the control rod also being received through a suitable opening 70 in the arm portion 36c of the associated clutch bracket 36 and retained therein by means of retainer rings 72 fixed on the control rod. A coil compression spring 74, termed the clutch spring, is mounted coaxially on the control rod 66 so that its opposite ends abut the frame member 20a and the head 66a of the control rod. Clutch spring 74 is selected so as to bias the control rod and the associated clutch bracket 36 toward their nonoperating position wherein the drive surface 46 or the clutch wheel is spaced from the associated carrier roller.

The actuator means 44 associated with each of the clutch wheels 32 includes a fluid pressure actuator 78 operable to overcome the biasing force of the associated clutch spring 74 and move the corresponding clutch bracket 36 and clutch wheel from their nonoperating position to an operating position wherein the peripheral drive surface 46 of the clutch wheel engages the associated carrier roller 16 in driving engagement therewith. Each fluid pressure actuator 78 includes a generally rectangular housing 80 which may be suitably mounted on the side frame member 20a and which has an actuator piston or fluid pressure diaphragm 82 acting against the arm 36c of support bracket 36. Each housing 80 defines a pressure chamber 84 rearwardly of the associated piston or diaphragm 82, each pressure chamber being connected through a suitable fluid pressure conduit 86 to a sensor control valve 88 (FIG. 2) of conventional design operative to control the introduction of fluid pressure into the chambers 84 of the actuators 78 within a selected one of the zones into which the conveyor is divided, as will become more apparent hereinbelow. Introduction of suitable fluid pressure into the actuator chambers 84 operates to extend the corresponding pistons or diaphragms 82 to pivot the clutch brackets upwardly about their pivot axes and effect engagement of the clutch wheel drive surfaces 46 with their corresponding carrier rollers 16.

In accordance with an important feature of the present invention, each clutch wheel 32 has an annular groove 94 formed in its peripheral drive surface 46 to receive the driving reach of a drive cable 96 for effecting driving rotation of the clutch wheels 32. The drive cable 96 has a circular transverse cross sectional configuration and preferably includes a suitable metallic core 96a, such as a suitable steel cable, having a uniform outer layer of vinyl or nylon 96b formed coaxially along the length of the core cable to provide a desired frictional drive surface for cooperation with the associated clutch wheel 32. The drive cable 96 comprises an endless drive cable which is reeved over support pulleys 98a and 98b (FIG. 1) suitably supported by the frame member 20a so that an upper reach or run of the drive cable 96 is established in parallel spaced relation below the coplaner axes of the carrier rollers 16, the upper reach of the drive cable being received within the annular grooves 94 in the clutch wheels 32. The pulleys 98a, b are adjustable through adjustment screws 100a and 100b, respectively, to permit adjustment of the axial tension in the drive cable. A return reach of the drive cable passes below the various clutch brackets 36. Suitable drive means (not shown of known design are operatively associated with one or both of the support pulleys 98a, b to effect predetermined constant speed movement of the drive cable 96 and thereby predetermined rotation of the associated clutch wheels 32.

As illustrated in FIGS. 3 and 4, the axis of the annular groove 94 in the clutch wheel 32 lies in a plane transverse to the rotational axis of the clutch wheel. The groove 94 has a substantially semi-circular base surface 94a, considered in transverse cross section through the clutch wheel, having a radius approximately equal to or just slightly greater than the radius of the associated drive cable 96. Side wall surfaces 94b and 94c are tangent to the semi-circular base surface 94a and lie in planes transverse to the rotational axis of the clutch wheel. The groove 94 is formed to a depth such that when the associated drive cable 96 is fully seated within the groove, the uppermost surface of the drive cable extends slightly above the plane of the drive surface 46 such as by a distance of approximately 0.030 inch. In this manner, when the drive wheels 32 are moved to operating positions wherein their peripheral drive surfaces 46 are in driving engagement with the associated carrier rollers 16, the drive cable 96 is compressed slightly into the groove 94. The clutch wheels 32 are formed so that such compression of the drive cable into the annular grooves 94 in the clutch wheels operates to deform the clutch wheels around approximately 50% or more of the portion of the drive cable received within the drive grooves and thereby effect greater frictional gripping engagement with the drive cable than would otherwise be obtained.

To still further increase the frictional gripping of the clutch wheels 32 with the drive cable 96 when the clutch wheels are in operative driving engagement with associated carrier rollers 16, an annular base slot is preferably formed at the base of the drive groove 94 which improves the pliability or flexure of the clutch wheels adjacent their drive grooves as the drive cable is compressed into the drive grooves by the carrier rollers 16.

In the embodiment of FIGS. 3 and 4, the base slot in the drive groove 94 takes the form of a slot 100 having a substantially rectangular transverse cross sectional configuration, and having its major axis lying in a plane normal to the axis of rotation of the clutch wheel and containing the center of curvature of the semicircular base surface 94a.

FIG. 6 illustrates an alternative embodiment of a clutch wheel, indicated at 32', in accordance with the present invention. The clutch wheel 32' has frustoconical peripheral drive surface 46' in which is formed an annular drive groove 94' similar in transverse cross section to the aforedescribed grooves 94 in clutch wheels 32. The clutch wheel 32' is in all respects identical to the aforedescribed clutch wheels 32 except that a slot 102 formed circumferencially of the clutch wheel at the base of groove 94' has a generally "T-shaped" transverse configuration defined by an annular rectangular slot 102a portion intersecting the base of the groove 94' through an annular slot portion 102b which lies in a plane normal to the axis of rotation of the clutch wheel and contains the center of curvature of the base surface 94a'.

In the embodiment of FIG. 6, the T-shaped slot 102 thus establishes a pair of annular rib-like elements 104a and 104b which have sufficient flexibility so that they are flexed radially inwardly by the drive cable 96 when the clutch wheel 32' is moved to its drive position wherein its peripheral drive surface 46' engages the associated carrier roller 16 in driving engagement therewith, the diameter of cable 96 and the depth of groove 94' being such that the drive cable is compressed inwardly as the clutch wheel is moved into driving engagement with the overlying carrier roller 16. Such resilient flexing of the clutch wheel 32' about the associated drive cable 96 increases the frictional gripping between the clutch wheel and drive cable so as to prevent any slippage therebetween and thereby improve drive efficiency.

The ability of the aforedescribed drive or clutch wheels 32 and 32' to provide increased gripping with the drive cable 96 as the clutch wheels are moved to driving positions wherein their peripheral drive surfaces 46 and 46' engage the associated carrier roller 16 in driving relation therewith is particularly important to assure that the carrier rollers maintain desired driving relation with packages, cartons or articles of different weight. For example, when relatively heavy articles are being conveyed which offer greater resistance to driving rotation of the carrier rollers 16 than do relatively light weight articles, slippage between the drive cable and drive or clutch wheels 32 and 32' may be prevented by increasing the force applied to the clutch brackets 36 and 36' so that the drive surfaces 46 and 46' of the clutch wheels engage their associated carrier roller with greater pressure contact. This causes the drive or clutch wheels to flex tighter about the drive cable 96 to increase gripping thereof.

In the illustrated embodiment, and with particular reference to FIG. 1, the conveyor 10 defines a plurality of descrete conveyor zones, such as indicated at 110a, b, c and d, which are of substantially equal length along the conveyor with each zone having six article carrier rollers 16 therein and a single article sensor arm such indicated at 112 in FIG. 2, positioned generally adjacent the forward end of each zone. Three drive means 30 are disposed within each conveyor zone 110a–d for operative association with alternate carrier rollers 16 and are operatively associated with the article sensor arm 112 in the next downstream zone so that when forward motion of an article is impeded within a particular zone, the corresponding article sensor arm is actuated to cause the clutch wheels 32 in the next adjacent upstream zone to move to nondriving positions so that forward driving of articles then in the corresponding upstream zone ceases. In this manner, slight or substantially zero impact force is experienced between accumulated articles on the conveyor 10.

Each of the article sensor arms 112 is pivotally mounted on and forms a part of an associated sensor control valve 88 which is connected through a suitable fluid conduit (not shown) to a source of fluid pressure, such as an air compressor or pressure tank. Each control valve 88 is also connected to three housings 80 of the fluid pressure actuators 78 associated with the clutch wheels in the next adjacent upstream zone of the conveyor, as through fluid pressure conduits 86. The sensor control valves are normally open so that the associated fluid pressure actuators 78 are subjected to fluid pressure when the associated sensor arms 112 are not depressed by articles on the conveyor, the resulting fluid pressure acting to extend the pistons 82 and effect driving engagement of the clutch wheels 32 with their associated carrier rollers 16.

In the operation of the accumulator conveyor 10 thus far described, the drive means (not shown) for the drive cable 96 is energized to effect driving rotation of the associated clutch wheels 32 which, as aforedescribed, receive drive cable 96 within the associated annular grooves 94 in the peripheral drive surfaces 46 of the clutch wheels so as to continually rotate the clutch wheels. Simultaneously, fluid pressure is introduced into the chambers 84 of the fluid pressure actuators 78 to extend the pistons 82 and effect movement of the clutch wheels to driving positions wherein their peripheral drive surfaces engage the carrier rollers 16 in driving relation therewith so as to convey articles along the conveyor. The article sensor arms 112 are positioned so as to be momentarily depressed as an article passes through the corresponding conveyor zone. Momentary depression of any one of the sensor arms 112 causes a slight but hardly perceptible interruption of fluid pressure to the associated fluid pressure actuators 78 in the next upstream zone so that movement of the corresponding clutch wheels 32 from their carrier rollers 16 is not appreciable and does not adversely affect their driving relation with the carrier rollers.

When an article, such as indicated at 12a, is stopped on the conveyor, as in zone 110b, by a manually controllable stop or other means, the underlying article sensor arm 112 is depressed to close the associated sensor control valve 88 which, when closed, is adapted to release air from the chambers 84 of the three pressure actuators 78 in the next upstream zone 110c. Releasing air from the fluid pressure actuators 78 permits the associated clutch springs 74 to pivot the clutch brackets 36 and associated clutch wheels 32 in zone 110c downwardly to disengage the clutch wheels from their associated carrier rollers. As article 12b stops, it in turn depresses the corresponding article sensor arm 112 within zone 110c to effect disengagement of the clutch wheels 32 in the next upstream zone 112d. In this manner, all articles or packages upstream from the article whose motion is initially impeded are brought to a stop and engage the next downstream article with very little pressure contact thereagainst.

When the first article in the chain of accumulated stopped articles on the conveyor is again allowed to progress forwardly, the corresponding sensor arm 112 is returned to its normal upward position whereby to effect reengagement of the clutch wheels 32 in the next upstream zone with their overlying carrier rollers 16 so as to effect forward movement of the article disposed within the next upstream zone. This action continues until all articles on the conveyor have resumed forward movement along the conveyor.

In accordance with an additional feature of the embodiment of the invention, illustrated in FIGS. 1-4, brake means, indicated generally at 116, are operatively associated with the drive means 30 and the carrier rollers 16 so as to effect braking of the carrier rollers when the clutch wheels 32 are moved to their nondriving positions as during an article accumulating mode of operation. This feature is particularly desirable when zero pressure force is desired between accumulated articles on the conveyor 10, and when articles of different weight are being conveyed. In the latter instance, braking of the carrier rollers in the various free zones of the conveyor prevents heavier weight articles from engaging lighter weight articles with forces sufficient to cause shingling of the lighter weight articles in successive order on the conveyor and having low profiles, such as trays, susceptible to shingling.

With particular reference to FIG. 4, taken in conjunction with FIG. 2, each brake means 116 is operative to brake two adjacent carrier rollers 16 when the clutch wheel 32 associated with one of the corresponding two carrier rollers is moved to its nondriving position. To this end, each brake means 116 includes a pair of identical generally L-shaped first brake brackets 118 each of which has an upstanding tab 118a received through a suitable rectangular opening 120 in the side frame member 20a so that the tabs 118 retain the brake brackets in hinged or pivotal relation to the side frame member. Each brake bracket 118 has an upstanding arm portion 118b on which is mounted a brake pad 122 made of suitable braking material such as rubber or the like. As illustrated in FIG. 2, the rectangular openings 120 are formed in the frame member 20a to underlie the rotational axes of the associated carrier rollers 16 so that the brake brackets 118 underlie the associated carrier rollers for pivotal movement between braking positions wherein the associated brake pads 122 engage the corresponding carrier rollers and positions wherein the brake pads are spaced from the carrier rollers to enable rotation thereof.

To effect movement of the brake brackets 118 between braking and nonbraking positions relative to their associated carrier rollers 16, each brake means 116 also includes a second brake bracket 124 which has a pivot arm portion 124a received through a suitable rectangular opening 126 in the side frame member 20a intermediate and spaced below the rectangular openings 120 for the corresponding brake brackets 118. The pivot arm 124a is retained within opening 126 by a releasable pin 128, and is enlarged at 124b to position the second brake bracket relative to frame member 20a.

Each brake bracket 124 has an upper actuating arm 130 which gives the upper end of the second brake bracket a generally "T" shape. The opposite ends of arm 130 underlie and engage a corresponding pair of adjacent brake brackets 118. Each brake bracket 124 also has a lower actuating arm 132 which in the illustrated embodiment extends laterally from one side of the second brake bracket and is adapted for engagement with the depending arm 36c of the clutch bracket 36 associated with one of the carrier rollers 16 on which the corresponding brake pads 122 operate.

The brake brackets 124 are thus adapted for cooperation with associated clutch brackets 36 and clutch wheels 32 so that when the clutch wheels are in driving engagement with associated carrier rollers 16, the brake brackets 124 assume positions wherein the corresponding brake brackets 118 and brake pads 122 are spaced from the corresponding carrier rollers 16. As the clutch brackets and associated clutch wheels 32 are moved to nondriving positions by springs 74 when the actuator chambers 84 are vented, the brake brackets 124 are pivoted in directions wherein their upper control arms 130 move the brake brackets 118 into braking positions to engage the brake pads 122 with the associated carrier rollers 16 in braking relation. Braking of the carrier rollers 16 prevents further forward movement of articles supported thereon so that the articles do not strike the downstream articles with any appreciable force. In this manner zero pressure accumulation is achieved.

It will be appreciated that with the carrier roller braking arrangement thus described, the number of carrier rollers braked can be selectively controlled by selective and relatively simple placement of the brake brackets 118 and control arms 130. Similarly, the control arms 130 can be lengthened or shortened as necessary to control the desired number of brake brackets 118. The lower actuating arms 132 can also be varied in length or position so as to cooperate with selected ones of the clutch wheel support brackets 36.

FIG. 7 illustrates an alternative manner of mounting the aforedescribed conveyor roller drive or clutch wheels 32 and 32' when it is desired that the clutch wheels be normally urged into driving relation with associated carrier rollers 16 and wherein actuator means, indicated generally at 44', are provided for selectively moving the clutch wheels to a non-driving positions spaced from their associated carrier rollers. In the embodiment of FIG. 7, the clutch wheel 32 is supported by a clutch bracket 140 which is generally similar to the aforedescribed clutch bracket 36 and includes an upstanding arm portion 140a which supports the associated clutch wheel 32 in similar fashion to the clutch bracket 36. The clutch bracket 140 has a second arm portion 140b which has its free end formed with a hinge tab 142 received through a corresponding rectangular opening 40 formed as aforedescribed in the frame member 20a, the clutch bracket being retained within the rectangular opening by an upstanding retainer tab 142a so that the clutch bracket is pivotally movable about a fulcrum established by the lower edge of the opening 40.

The clutch bracket 140 has a depending arm portion 140c which is spaced inwardly from the plane of the side frame member 20a and is substantially parallel thereto when the peripheral drive surface 46 on the clutch wheel 32 is in driving engagement with the associated carrier roller 16.

The clutch bracket 140 and associated clutch wheel 32 are biased to positions wherein the clutch wheel is in driving engagement with the associated carrier roller 16 by a coil compression spring 146 which is supported coaxially on an actuating rod 148 so that the opposite ends of the compression spring act against the depending arm 140c of the clutch bracket and against a depending leg 150a of a generally "Z" shaped bracket 150 affixed to a bottom horizontal flange 20c on the frame member 20a. The control rod 148 is slidably received through a suitable opening in the depending leg 150a and has its inner end received through a suitable opening in and secured to the depending arm 140c of clutch bracket 140, as through a retainer ring or snap ring 154.

The control rod 148 has an enlarged head 148a which is adapted to be acted upon by the lower end 158a of an actuating lever or arm 158 received downwardly through suitable rectangular openings 160 and 162, respectively, in the lower flange 20c of frame member 20a and in bracket 150 so that the lever arm 158 may pivot about horizontal pivot axes established by the forward and rearward longitudinal edges of opening 160. The control rod 148 and associated head 148a are configured such that during normal operation of the clutch wheel support arrangement illustrated in FIG. 7, that is, with the clutch wheel 32 normally urged into driving engagement with the corresponding carrier roller 16 by brasing spring 146, the lever arm 158 is maintained in a substantially vertical position by engagement of its lower end with the head 148a and its upper end with the actuator piston 82' of the actuator means 44'.

The actuator means 44' associated with the driven carrier rollers of a particular zone of the conveyor, such as one of the aforementioned zones 110a, b, c and d, are connected to suitable sensor means in an adjacent free zone of the conveyor so that when an article is stopped within the adjacent free zone, the actuator means 44' in the next upstream zone are actuated to extend the associated actuator pistons 82' and pivot the corresponding lever arms 158 so as to draw the associated control rods 148 and support bracket arms 140c toward the frame member 20a. This results in the corresponding clutch wheels 32 being moved to a non-operating positions disengaged from their associated carrier rollers 16. It will be understood that various types of sensors could be utilized with the fluid pressure actuator 44', and also that alternative types of actuators, such as an electrical actuator, could be employed in place of the illustrated fluid pressure actuator 44'.

In the embodiment illustrated in FIG. 7, failure or interruption of the fluid pressure system to the fluid pressure actuators would not result in inadvertent disengagement of the drive or clutch wheels from their associated carrier rollers, and may be particularly desirable where the conveyor passes through a relatively inaccessible area where an operator could not readily reach articles on the conveyor in the event of a failure or interruption in the fluid pressure supply to the actuators.

While the embodiment illustrated in FIG. 7 has not been shown in connection with brake means of the type illustrated at 116 in FIG. 4, it will be appreciated that similar brake means could be provided with the embodiment of FIG. 7 so that one or more carrier rollers 16 are braked when the associated clutch wheels 32 are moved to non-driving positions spaced from their associated carrier rollers.

FIG. 8 illustrates another alternative manner of mounting the aforedescribed conveyor roller drive wheels 32 and 32' when low pressure contact between accumulated articles on the conveyor is permissible. In the embodiment shown in FIG. 8, the aforementioned fluid pressure actuator means 44 and braking means 116 are dispensed with, and biasing means, generally indicated at 116, is employed to selectively urge a drive wheel support braket 36" toward a position wherein the associated frustoconical shaped drive wheel 32" engages the associated carrier roller 16 in continual driving engagement therewith. The biasing means 166 includes a control rod 168 which is received through a circular opening 170 in the side frame member 20'a and has a threaded end opposite the head 168a which extends through a suitable opening in the depending arm 36"c of support bracket 36" and is retained therein by a nut 172. The biasing means 166 also includes a coil compression spring 174 mounted coaxially on the control rod 168 between the side frame number 20'a and the depending bracket arm 36"c and operates to urge the bracket 36" pivotally upwardly so that the drive wheel 32" engages its associated overlying carrier roller 16 in driving relation. The biasing force applied by spring 174 against the support bracket 36", and thus the contact pressure of drive wheel 32" against its associated carrier roller, may be varied by selecting a spring 174 of predetermined spring rate, while positional adjustment of the bracket 36" may be effected through adjustment of nut 172 on control rod 168.

Thus, in accordance with the present invention, an accumulator conveyor is provided which employs, in various embodiments, a number of features which result in highly efficient operation. More particularly, the various embodiments of drive or clutch wheels indicated at 32, 32' and 32" have frustoconical peripheral drive surfaces in which annular grooves are formed to receive the driving reach of a drive cable between the respective drive grooves and overlying carrier rollers, the drive or clutch wheels and annular grooves being adapted to effect increased gripping relation with the drive cable as the drive or clutch wheels are moved to positions wherein the peripheral drive surfaces thereon engage associated carrier rollers in driving relation therewith. This is particularly beneficial to achieve improved sensitivity to articles of varying weight conveyed on the associated conveyor, i.e., the drive or clutch wheels maintain highly efficient driving relation with their associated carrier rollers irrespective of whether the articles being conveyed are relatively lightweight or heavy.

The employment of annular grooves in the peripheral drive surfaces of the drive or clutch wheels to effect improved frictional gripping of the drive cable eliminates the need for hold-down rollers which have heretofore been employed to maintain conveyor roller drive cables in suitable driving relation with drive wheels during operation of the conveyors. This is due to the fact that when the drive or clutch wheels are in driving engagement with their associated carrier rollers, the drive cable is forced downwardly into the annular drive grooves and causes and inward flexing of the walls of the annular grooves to effect greater gripping of the drive cable. The drive wheels and associated annular drive grooves of the present invention also assist in containing the drive cable when negotiating horizontal curves, and enable skewing of the conveyor carrier rollers without adverse effect on the driving relation between the drive or clutch wheels and the drive cable.

By selective dimensioning of the length of the depending arms 36c, 36'c, 36"c and 140c of the illustrated drive wheel support brackets 36, 36', 36" and 140, respectively, and selective positioning of the compression springs acting on the various support brackets, the force required to effect a predetermined pressure contact of the drive or clutch wheels against the carrier rollers may be adjusted so that only a relatively small actuating force is required. This is significant in enabling the use of compression springs 74, 146 and 168 of relatively low spring rate. By employing compression springs of low spring rate, the operator can readily move the associated support brackets to positions facilitating replacement or servicing of the drive cable and/or clutch wheels.

By selectively providing the carrier roller drive means 30 with brake means 116, braking of selective ones of the carrier rollers may be readily accomplished when the drive or clutch wheels are disengaged from the carrier rollers so that pressure contact between accumulated articles on the conveyor is substantially zero.

While various embodiments of the present invention have been illustrated and described, it will be understood that changes and modifications may be made therein without departing from the invention in its broader aspects. Various features of the invention are defined in the following claims.

What is claimed is:

1. Conveyor apparatus comprising, in combination, frame means, a plurality of carrier rollers supported by said frame means and defining a path of travel along which articles may be conveyed, and drive means operatively associated with at least one of said carrier rollers and adapted to effect rotation thereof in a manner to move an article engaged by said at least one of said rollers along said guide path, said drive means including a drive wheel having a peripheral drive surface in which is formed an annular groove, a drive cable having circular transverse cross section, means supporting said drive cable so as to define a drive reach substantially parallel to said path of travel, and means supporting said drive wheel so that its said peripheral drive surface is adapted for driving engagement with said at least one of said carrier rollers and with said reach of cable disposed between said drive wheel and said carrier roller and received within said annular groove, said annular groove in said drive wheel having a generally semicircular transverse base configuration adapted for surface engagement with said drive cable passing therethrough, said base surface being spaced generally radially inwardly from said peripheral drive surface a distance less than the diameter of said drive cable such that said drive cable is pressed into said annular groove to deform said drive wheel about said cable when said peripheral drive surface is in driving engagement with said at least one of said carrier rollers, said means supporting said drive wheel being adapted to selectively move said drive wheel between a first position spaced from said at least one of said carrier rollers and a second position wherein said peripheral drive surface engages said carrier roller so as to effect increased gripping of said drive wheel with said cable.

2. Conveyor apparatus as defined in claim 1 including a plurality of substantially indentical drive wheels, and means supporting each of said drive wheels for driving engagement with a selected one of said carrier rollers and with said drive reach of said drive cable received through the corresponding annular groove in driving relation therein.

3. Conveyor apparatus as defined in claim 1 wherein said wheel has an annular slot formed circumferentially thereabout at the base of said annular groove, said slot intersecting said annular groove and being configured to cause said drive wheel to flex about said drive cable in increased frictional gripping relation therewith as said peripheral drive surface is caused to engage said carrier roller in pressure engagement therewith.

4. Conveyor apparatus as defined in claim 3 wherein said annular slot is substantially rectangular in transverse cross-sectional configuration and is positioned so that its longitudinal axis lies in a plane substantially normal to the axis of rotation of said drive wheel.

5. Conveyor apparatus as defined in claim 3 wherein said annular slot is substantially T-shaped in transverse cross-sectional configuration and intersects said annular groove at the radially innermost base surface thereof.

6. Conveyor apparatus as defined in claim 1 wherein said drive wheel comprises a clutch wheel, said means supporting said clutch wheel includes clutch bracket means which enables said movement of said clutch wheel between said first nondriving position spaced from said at least one of said carrier rollers and said second driving position effecting driving engagement of said peripheral drive surface with said carrier roller, and including means cooperable with said clutch bracket means and responsive to stopping of an article along said guide path for moving said clutch wheel from a selected one of its said first and second positions to the other of said first and second positions.

7. Conveyor apparatus as defined in claim 6 wherein said drive surface of said clutch wheel has a frustoconical configuration, said clutch bracket means being adapted to move said clutch wheel into engagement with said carrier roller so that said peripheral drive surface establishes substantially line contact with said carrier roller.

8. Conveyor apparatus as defined in claim 6 including brake means operatively associated with said clutch bracket means and operative to brake at least one of said carrier rollers when said clutch wheel is in its said nondriving position.

9. Conveyor apparatus as defined in claim 8 wherein said brake means includes a plurality of brake elements supported by said frame means in operative association with selected ones of said carrier rollers, said brake elements being movable between first positions spaced from said selected ones of said carrier rollers and second positions in braking relation therewith, and brake actuating means operatively associated with said brake elements and operative to move said brake elements from their said first to said second positions so as to brake said selected ones of said carrier rollers when said clutch wheels are in their said nondriving positions.

10. Conveyor apparatus comprising, in combination, frame means, a plurality of carrier rollers supported by said frame means and defining a path of travel along which articles may be conveyed, drive means operatively associated with at least one of said carrier rollers and adapted to effect rotation thereof in a manner to move an article engaged by said at least one of said carrier rollers along said guide path, said drive means including a clutch wheel having a peripheral drive surface, a drive cable, means supporting said drive cable so as to define a drive reach substantially parallel to said path of travel, clutch bracket means supporting said clutch wheel in driven cooperation with said drive cable and for movement between a nondriving position spaced from said one of said carrier rollers and a driving position wherein said peripheral drive surface engages said carrier roller in driving relation therewith, actuator means operatively associated with said clutch bracket means and adapted to effect movement of said clutch wheel between its said first and second positions, and brake means including first brake brackets each of which is pivotally mounted on said frame means so as to underlie a selected one of said carrier rollers, each of said first brake brackets being movable between a position spaced from its associated carrier roller and a position in braking relation therewith, and brake actuating means comprising a plurality of second brake brackets each of which is pivotally mounted on said frame means and has cooperative relation with at least one of said first brake brackets and said clutch bracket means so as to effect braking of said carrier rollers when said clutch wheels are in their said nondriving positions.

11. A drive wheel for use in driving a carrier roller in a conveyor or the like, said drive wheel comprising a substantially circular unitary wheel body defining a rotational axis coincident with the longitudinal axis of said body, said wheel body having an annular frustoconical peripheral drive surface, and an annular groove formed in said drive surface and having a base surface of substantially semi-circular transverse cross-section, said groove being adapted to receive a drive cable therein having a circular transverse cross-section the radius of which is substantially similar to the radius of curvature of said semi-circular base surface, said wheel body and annular groove being formed so as to compress about the contacted surface of said drive cable to effect increased frictional gripping therewith when said cable is caused to be pressed generally radially into said annular groove during rotation of said drive wheel.

12. A drive wheel as defined in claim 11 wherein said drive surface has predetermined longitudinal length, said annular groove being formed substantially midlength of said drive surface.

13. A drive wheel as defined in claim 11 including an annular slot formed in said unitary wheel body at the base of said annular groove, said annular slot being configured to increase the flexibility of said wheel body contiguous to said annular groove so as to effect increased frictional gripping of said drive wheel with said drive cable as said cable is urged into said annular groove.

14. A drive wheel as defined in claim 13 wherein said annular slot is substantially rectangular in transverse cross-sectional configuration.

15. A drive wheel as defined in claim 13 wherein said annular slot is substantially T-shaped in transverse cross-section.

* * * * *

UNITED STATES PATENT AND TRADEMARK OFFICE
CERTIFICATE OF CORRECTION

PATENT NO. : 4,278,166
DATED : July 14, 1981
INVENTOR(S) : Michael S. Pirro, Jr.

It is certified that error appears in the above—identified patent and that said Letters Patent is hereby corrected as shown below:

Column 6, line 57, "(not shown" should be --(not shown)--.

Column 7, line 13, "groove" should be --grooves--.

Column 12, line 29, "116" should be --166--.

Signed and Sealed this

Twenty-second Day of September 1981

[SEAL]

Attest:

GERALD J. MOSSINGHOFF

Attesting Officer

Commissioner of Patents and Trademarks